US007604386B2

(12) United States Patent
Rawlings et al.

(10) Patent No.: US 7,604,386 B2
(45) Date of Patent: Oct. 20, 2009

(54) LAMP ASSEMBLY HAVING A SOCKET MADE FROM HIGH TEMPERATURE PLASTIC

(75) Inventors: Lindsay Rawlings, Perrysburg, OH (US); Mark Molinaro, Fort Wayne, IN (US)

(73) Assignee: Federal-Mogul World Wide, Inc, Southfield, MI (US)

( * ) Notice: Subject to any disclaimer, the term of this patent is extended or adjusted under 35 U.S.C. 154(b) by 93 days.

(21) Appl. No.: 11/561,045

(22) Filed: Nov. 17, 2006

(65) Prior Publication Data

US 2007/0139948 A1 Jun. 21, 2007

Related U.S. Application Data

(60) Provisional application No. 60/738,114, filed on Nov. 18, 2005.

(51) Int. Cl.
*B60Q 1/00* (2006.01)
*H01R 33/00* (2006.01)
*H01R 13/40* (2006.01)
*H01R 13/627* (2006.01)

(52) U.S. Cl. ....................... 362/548; 362/652; 439/349; 439/593; 439/602; 439/699.2

(58) Field of Classification Search ................. 362/548, 362/652–655; 439/56, 345, 349, 593, 602, 439/691, 699.2; 313/318.07, 318.09
See application file for complete search history.

(56) References Cited

U.S. PATENT DOCUMENTS 4,647,132 A * 3/1987 Mikola ....................... 439/345
4,724,353 A * 2/1988 Devir .................... 313/318.07
4,958,429 A 9/1990 Forish et al.
4,979,082 A * 12/1990 Devir ......................... 362/645
5,000,702 A 3/1991 Forish et al.
5,035,643 A 7/1991 Forish et al.
5,113,104 A 5/1992 Blaettner et al.
5,172,026 A * 12/1992 Hall et al. ................ 313/318.1
5,186,669 A 2/1993 Holman et al.
5,237,231 A 8/1993 Blaettner et al.
5,358,341 A 10/1994 Blaettner et al.
5,486,991 A 1/1996 Bodem, Jr.
5,492,980 A 2/1996 Moriwaki
5,497,039 A 3/1996 Blaettner et al.

(Continued)

FOREIGN PATENT DOCUMENTS

WO WO02075863 A1 9/2002

*Primary Examiner*—Alan Cariaso
(74) *Attorney, Agent, or Firm*—Robert L. Stearns; Dickinson Wright PLLC

(57) ABSTRACT

A lamp socket for an automotive exterior lamp assembly that can be used with a replaceable incandescent bulb. The lamp socket comprises a plastic socket made from nylon 4,6. The lamp socket exhibits reduced outgassing that would otherwise result from photo-oxidative degradation of the polymers in the plastic socket. This helps prevent fogging of the lamp assembly lens and/or reflector for improved performance and aesthetic appearance over the life of the lamp assembly. The incandescent bulb used in the assembly can include a press-sealed end having a sleeve attached over the press-sealed end, and the sleeve can be made from at least one of nylon 4,6, PEI and PPA. The incandescent bulb may also have a molded plastic base, and the base can also be made from at least one of nylon 4,6, PEI and PPA.

10 Claims, 4 Drawing Sheets

U.S. PATENT DOCUMENTS

| | | | | |
|---|---|---|---|---|
| 5,531,613 | A * | 7/1996 | Takano et al. | 439/544 |
| 5,536,174 | A | 7/1996 | Forish | |
| RE35,855 | E | 7/1998 | Blaettner et al. | |
| 5,883,192 | A | 3/1999 | Natori et al. | |
| 6,012,830 | A | 1/2000 | Fraizer | |
| 6,139,334 | A | 10/2000 | Forish et al. | |
| 6,210,014 | B1 * | 4/2001 | Kubizne et al. | 362/547 |
| 6,548,949 | B2 * | 4/2003 | Ishihara | 313/318.09 |
| 6,815,878 | B2 * | 11/2004 | Bryant | 313/318.01 |
| 6,992,429 | B2 * | 1/2006 | Ishihara | 313/318.05 |
| 7,059,753 | B2 * | 6/2006 | Kruger et al. | 362/538 |
| 2002/0061964 | A1 | 5/2002 | Arai et al. | |
| 2004/0082205 | A1 * | 4/2004 | Nishihata et al. | 439/73 |
| 2004/0165411 | A1 | 8/2004 | Heath et al. | |
| 2005/0014870 | A1 | 1/2005 | Sato et al. | |
| 2006/0167134 | A1 | 7/2006 | Sato et al. | |

* cited by examiner

LAMP ASSEMBLY HAVING A SOCKET MADE FROM HIGH TEMPERATURE PLASTIC

CROSS-REFERENCES TO RELATED APPLICATIONS

This patent application claims priority to U.S. Provisional Patent Application Ser. No. 60/738,114, filed Nov. 18, 2005, which is incorporated herein by reference in its entirety.

TECHNICAL FIELD

This invention relates to lamp sockets and lamp assemblies and, in particular, to automotive lamp socket assemblies used in exterior lighting applications.

BACKGROUND OF THE INVENTION

Lamp sockets used in exterior vehicle lighting applications are typically made from plastic. One commonly used plastic alloy for these sockets is a glass filled blend of polyphenylene oxide (PPO) and nylon 6,6, sold by General Electric Company under the trademark Noryl GTX 810. This plastic, as with most others, outgases to some extent during normal use in its intended vehicle lighting application. Outgassing of plastics such as the Noryl GTX 810 is known to cause fogging on the other lamp assembly components (e.g., lenses and/or reflectors) which can adversely affect the appearance, aesthetics, and photometric performance of the overall lamp assembly. Various approaches have been proposed for reducing the outgassing of such materials. See, for example, U.S. Pat. No. 6,012,830 to Frazier which discloses a light shield for a vehicle headlamp that uses a titanium carbide coating that reportedly does not outgas over the life of the headlamp. As another example, PCT published application No. WO 02/075863 A1 to Heath discloses a lamp socket formed from polyetherimide (PEI) which has been found to reduce fogging of the lenses and reflectors when compared to the Noryl GTX 810 plastic.

In a typical vehicle exterior signal lighting application or similar application, such as in a S-8/GT-8 bulb application, this fogging shows up over time as a film that forms on the interior surface of the lens and reflector surfaces used in the lamp assembly. For sockets using the Noryl GTX 810, this film has previously been analyzed and determined to be cyclic dimers, $C_{12}H_{22}O_2N_2$ from the nylon 6,6 in the plastic. More recent analysis of the film from testing of the lamp sockets at 130° C. for 90 minutes has shown that the lamp socket produces styrene and toluene type structures. Furthermore, under the same testing conditions, it was found that the nylon sleeve, or base, used on the GT-8 bulb was itself producing aniline and benzene type structures.

While the use of PEI has been identified for lamp socket assemblies for exterior lighting applications, including use for the socket, housing or both, there exists a need to identify additional materials which may be used for lamp sockets and lamp assemblies of the types described above.

SUMMARY OF THE INVENTION

In accordance with the present invention, there is provided a lamp socket assembly that can be used with a replaceable incandescent bulb or other high temperature light source in applications where it is desirable or necessary to limit outgassing of the socket assembly. The socket assembly comprises a high temperature plastic socket body comprising nylon 4,6 plastic. The socket has an opening to receive a press-sealed end of an incandescent bulb, and a plurality of electrical contacts are located in the opening to mate with corresponding lead wires on the bulb. The contacts are electrically connected within the socket to corresponding terminals for connecting the socket into the vehicle wiring harness. Preferably, the socket comprises a socket housing and a separate socket body integrally attached to the socket housing, with the socket body being made from nylon 4,6 and the socket housing being made from a lower temperature plastic, such as various polyamides, such as nylon 6 or nylon 6,6, and blends and co-polymers thereof.

In accordance with another aspect of the present invention, there is provided an incandescent bulb or other high temperature light source having a glass envelope, a light emitting element in the envelope, a plurality of lead wires supporting the light emitting element within the envelope, and a sleeve attached over a press-sealed end of the envelope. The sleeve comprises a nylon 4,6 material. In certain bulb applications, the press-sealed end of the bulb envelope and plastic sleeve may be replaced by a molded plastic base having terminals which are electrically connected to the lead wires and adapted to extend out of the base for electrical connection to electrical terminals of the socket assembly. The base may be formed from a high temperature plastic having a reduced propensity for outgassing, such as nylon 4,6, PEI or polyphthalamide (PPA).

In accordance with another aspect of the present invention there is provided an automotive lamp assembly that includes a lamp socket, an incandescent bulb removably mounted within the lamp socket, a reflector extending at least partially around the bulb, and a lens, with at least a portion of the lamp socket being made from nylon 4,6.

In accordance with yet another aspect of the present invention, there is provided a lamp socket assembly that can be used with a replaceable incandescent bulb or other high temperature light source in applications where it is desirable or necessary to limit outgassing of the socket assembly. The socket assembly comprises a high temperature plastic socket body comprising nylon 4,6 plastic. The incandescent bulb or other high temperature light source having a glass envelope, a light emitting element in the envelope, a plurality of lead wires supporting the light emitting element within the envelope, and a high temperature plastic sleeve attached over a press-sealed end of the envelope. The sleeve material may comprise a high temperature plastic having a reduced propensity for outgassing, such as nylon 4,6, PEI or PPA manufactured and sold by Solvay Advanced Polymers under the trademark AMODEL. In certain bulb applications, the press-sealed end of the bulb and plastic sleeve may be replaced by a molded plastic base having terminals which are electrically connected to the lead wires and adapted to extend out of the base for electrical connection to electrical terminals of the socket assembly. The base may be formed from a high temperature plastic having a reduced propensity for outgassing, such as nylon 4,6, PEI or PPA.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

In the embodiments described below and shown in the attached drawings, the lamp socket body and sleeves used on the bulb wedge base are made from nylon 4,6 which has been found to undergo reduced outgassing when compared to at least some of the prior art plastic materials currently used in the industry. Research by the inventors has indicated that outgassing of lamp sockets made from polyamide (PA) Noryl GTX 810 plastic lamp sockets during normal use in service is primarily the result of photo-oxidative degradation of the plastic material caused by UV light emitted from the clear incandescent bulbs used in the sockets. The use of a nylon 4,6 socket assembly, particularly one having a socket body formed from this material, significantly reduces outgassing of the lamp socket assembly when used in its intended environment. This is due to chemical and physical characteristics of nylon 4,6 which provide improved thermal stability, including reduced socket outgassing, mechanical strength and dimensional stability, as described below.

Figure 1:
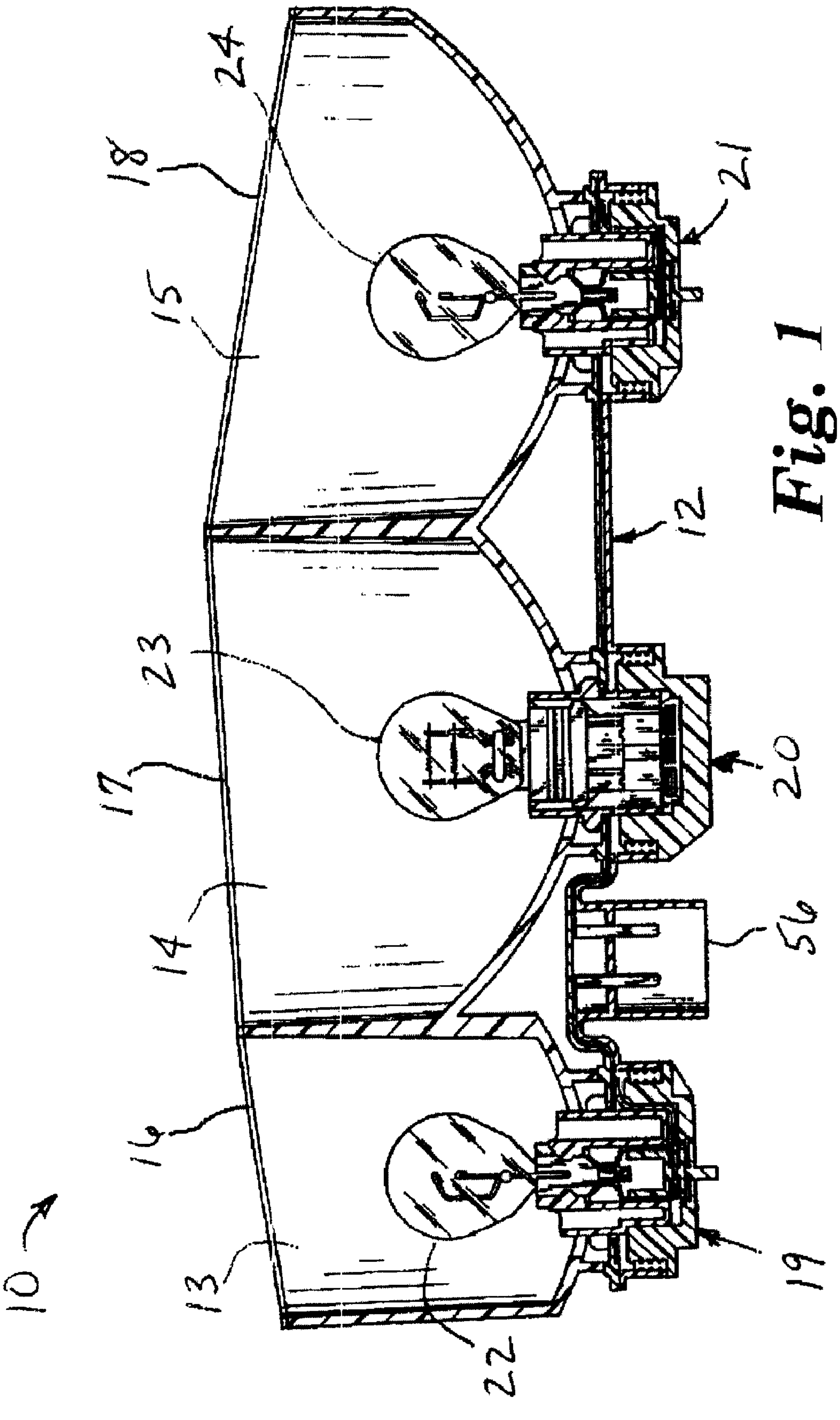
FIG. 1 is a side view of an exterior vehicle lamp assembly constructed in accordance with the present invention and showing portions of the assembly in cross-section.

FIG. 1 depicts an exterior vehicle lamp assembly 10 such as can be used for rear vehicle lighting to provide separate, rearwardly-directed illumination for braking, turn signaling, and backing up. The assembly 10 includes a common backplate 12 to which is mounted three reflectors 13-15 that are formed as a unitary component with each of the three reflector sections 13-15 being covered by a respective lens 16-18 and having a central opening in which is located a respective lamp socket 19-21. Each lamp socket is individually mounted to the common backplate 12 and each contains or may operatively receive an incandescent bulb 22-24 or other known light source having an operating temperature range similar to that of an incandescent bulb, such as, for example, 200-450° F. Lamp assembly 10 may comprise multiple lamp sockets 19-21 and reflectors sections 13-15, or a single lamp socket and reflector section, in any combination. The lamp assembly 10 of FIG. 1 is only on example of such an assembly, as will be appreciated by one of ordinary skill in the art, many other configurations or embodiments of these elements are possible.

Figure 2:
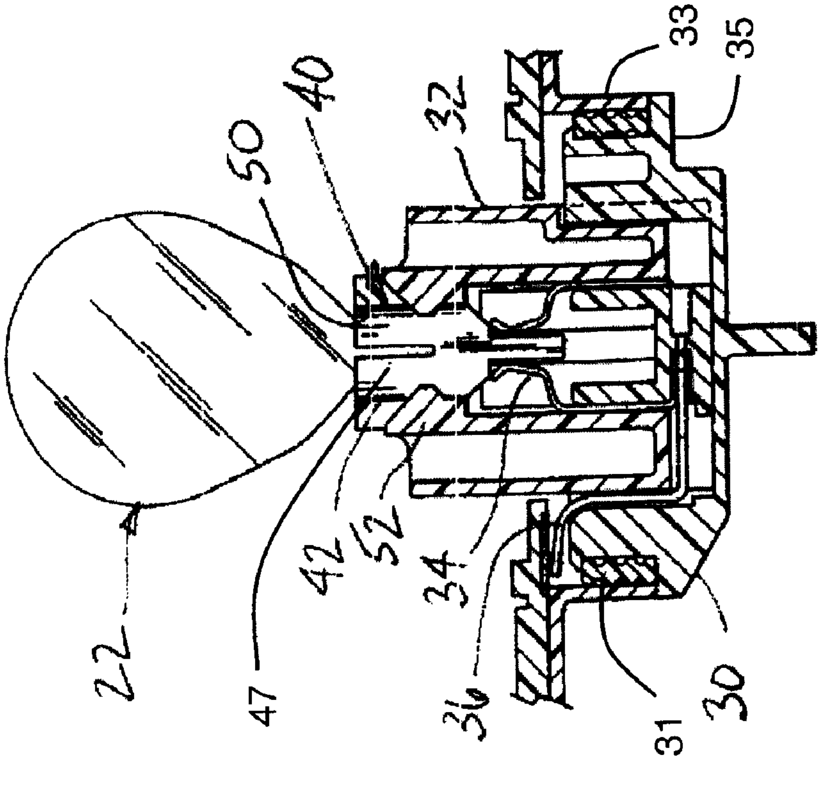
FIG. 2 is a cross-sectional view of one of the lamp sockets of FIG. 1.

FIG. 2 depicts further details of one of the lamp sockets 19 and its associated bulb 22. As shown therein, the lamp socket 19 is actually a socket assembly formed from a socket housing 30, a socket body 32 mounted in the housing, a set of electrical contacts 34 within the body 32 to deliver power to the bulb 22, and a corresponding set of terminals 36 (only one shown in the cross-sectional view) that are electrically connected to the contacts 34 to deliver power from the backplate 12 to the contacts 34. The socket body 32 is in touching contact with bulb 22, and thus is exposed to the highest operating temperatures in conjunction with the operation of assembly 10 in bulb 22, which can include temperatures of between 200-450° F. Socket housing 30 houses socket body 32 and is generally not in direct contact with the bulb 22 or other light source, and thus is exposed to temperatures which are somewhat lower than socket body 32. The extent of the temperature difference is dependent on various aspects of the design, such as the wall thickness of the socket body, the thermal conductivity of the plastic used, the size of the lamp cavity and other factors that influence the temperature drop from bulb 22 to housing 30. The bulb 22 is an incandescent bulb or other similar light source having a press-sealed end 40 that includes a plastic sleeve 42 having a recessed channel that allows that bulb to be resiliently held in place within the lamp socket 19. Suitable bulb and sleeve designs for the bulb 22 are disclosed in U.S. Pat. No. 5,186,669 to Holman et al. and U.S. Pat. No. 5,486,991 to Bodem, Jr., the complete disclosures of which are hereby incorporated by reference. Suitable, existing GT-8 bulbs are also commercially available from the Wagner Lighting division of Federal-Mogul Corporation.

The bulb 22 is mounted in an opening 50 in the body 32 of the socket 19. Located within that opening 50 are the electrical contacts 34 as well as a pair of opposing flexible retaining members, or fingers, 52. These fingers each engage the sleeve 42 at the press-sealed end of the incandescent bulb 22 and thereby retain the bulb within the opening 50. This is accomplished as shown by providing each retaining finger 52 with a protrusion that faces the opposing finger and that snaps into its corresponding recessed channel on the sleeve 42 when the bulb 22 is inserted into the opening. Since the fingers 52 are flexible, the bulb is not an integral part of the socket, but is removable and replaceable by exerting enough upward force on the bulb to cause the fingers to flex outwardly so that the press-sealed end of the bulb is able to move up and out of the socket 19. Thus, assembly 10 may include bulb 22, or be provided without bulb 22, such that bulb 22 is provided as a non-assembled portion of assembly 10, or as a completely separate component. Many other configurations and embodiments of socket 19 and contacts 34 are possible and within the scope of the invention.

The electrical contacts 34 are located within the body 32 and the terminals 36 are located within the housing 30 such that the contacts and terminals are separate components that connect together at the interface between the housing and body. However, each contact is associated with a terminal and other embodiments of the socket assembly 10 could be used in which the contacts are unitary extensions of the terminals rather than separate components. The terminals are designed to mate with corresponding pads on the backplate 12 so that a single connector 56 can be used to supply power to all three sockets 19-21.

A more complete description of the socket assembly 10 in general and the sockets 19-21 and backplate 12 in particular is contained in U.S. Pat. No. 5,536,174 to Forish, the complete disclosure of which is hereby incorporated herein by reference. U.S. Pat. No. 6,139,334 to Forish et al. also discloses an alternative backplate and socket assembly which can also suitably be used without departing from the scope of the present invention, and the complete disclosure of that patent is also hereby incorporated by reference. Also, rather than using a two-part socket assembly with both a housing and a body integrally attached to the housing, a single unitary housing which also incorporates the features of the body could be used. In a unitary socket housing arrangement, the body features could be formed of nylon 4,6, and the remainder of the housing could be formed of a lower temperature plastic, including various other polyamides, such as nylon 6 or nylon 6,6, or blends or co-polymers thereof, as a two-part molded product, using two-shot molding, double shot molding, insert molding or similar plastic molding techniques.

Figure 3:
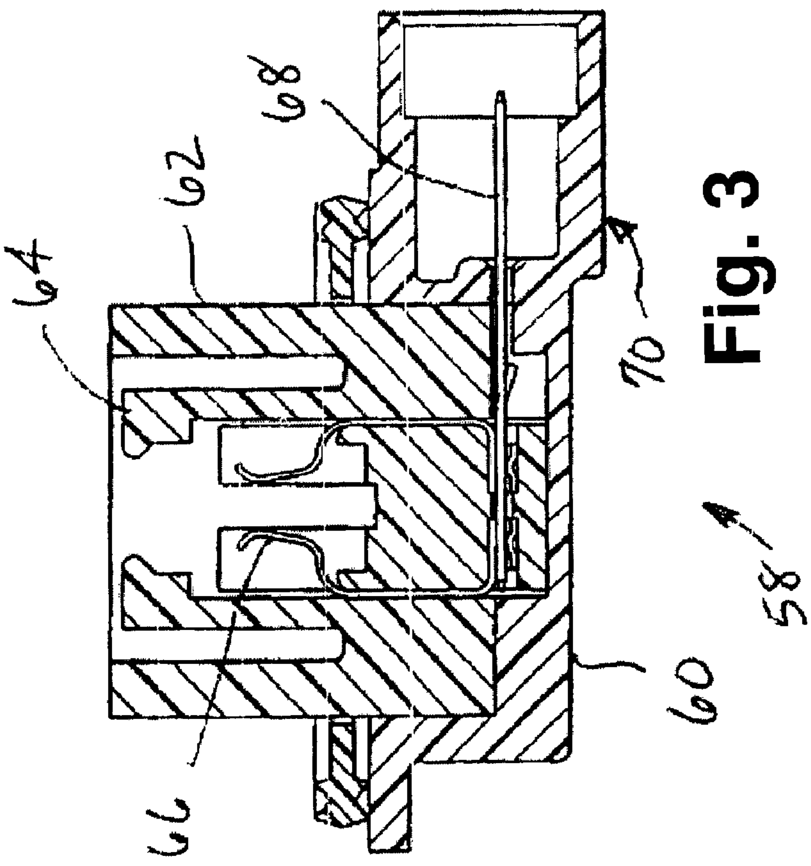
FIG. 3 is a cross-sectional view of an alternative embodiment of a lamp socket of the present invention.

FIG. 3 shows an alternative embodiment of a lamp socket assembly 58 of the present invention which can be used in applications where the common backplate 12 is not used. As with the embodiment of FIG. 2, the socket assembly 58 of FIG. 3 includes a housing 60 and a body 62 with fingers 64, as well as electrical contacts 66 and terminals 68, but also includes a connector 70 that surrounds the terminals as a unitary part of the housing 60. Such a socket assembly 58 could also incorporate more than one socket. A more complete description of lamp socket assembly 58 as well as additional socket embodiments is contained in U.S. Pat. No. 5,035,643 to Forish et al., the complete disclosure of which is hereby incorporated herein by reference.

In accordance with one aspect of the invention, lamp socket assemblies 19-21 and 60 are made using nylon 4,6. Both the housing 30, 60 and body 32, 62 may be made from nylon 4,6, although it will be appreciated that both need not be, so that, for example, a socket assembly can be constructed with only body 32, 62 made from nylon 4,6. In a preferred embodiment of lamp assembly 10, body 32, 62 is formed from nylon 4,6 to obtain the advantages described herein with regard to reduced outgassing, thermal and mechanical stability as well as other advantages described herein. Housing 30, 60, which is exposed to lower operating temperatures, is formed from a different plastic, particularly a plastic that has reduced performance with respect to outgassing; an example of a suitable plastic is Noryl GTX 810. Other plastics having outgassing performance which is inferior to that of nylon 4,6, but still suitable for use in housing 30, 60, are believed, to include all manner of polyamides, including blends and co-polymers thereof, such as nylon 6 and nylon 6,6, and blends and co-polymers thereof. Other engineering plastics may also be suitable for use in housing 30, 60, so long as they may be operatively attached to bodies 32, 62, either by a mechanical joint or other physical attachment means, or by a chemical bond as in the case of co-molding. In the case of a glass-filled polyamide-polyphelylene oxide (PA-PPO) co-polymer (Noryl GTX 810), body 32, 62 was attached to housing 30, 60 using ultrasonic welding. The welding of housing 30, 60 may be understood by reference to FIGS. 5-9.

Figure 5:
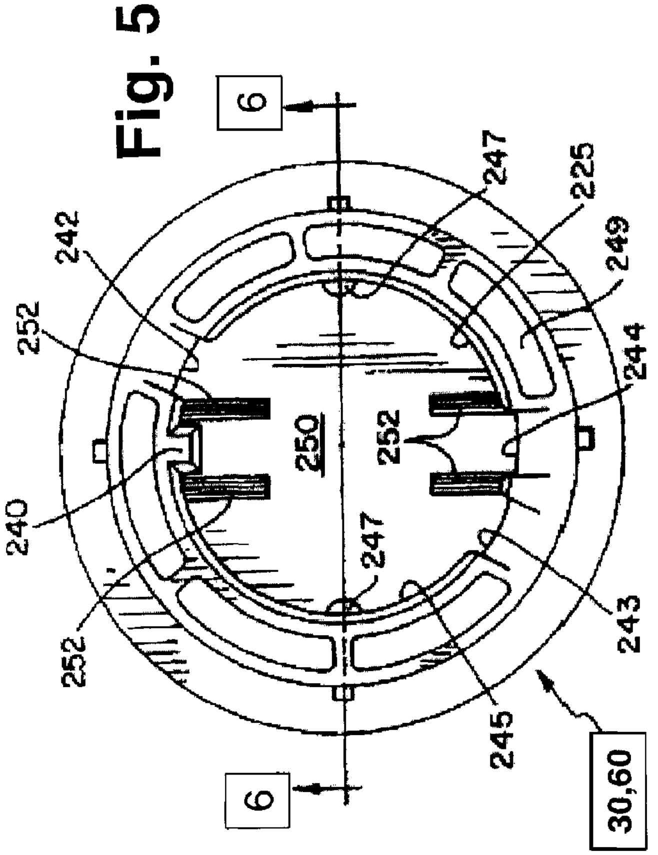
FIG. 5 is a top plan view of the socket assembly housing.
Figure 6:
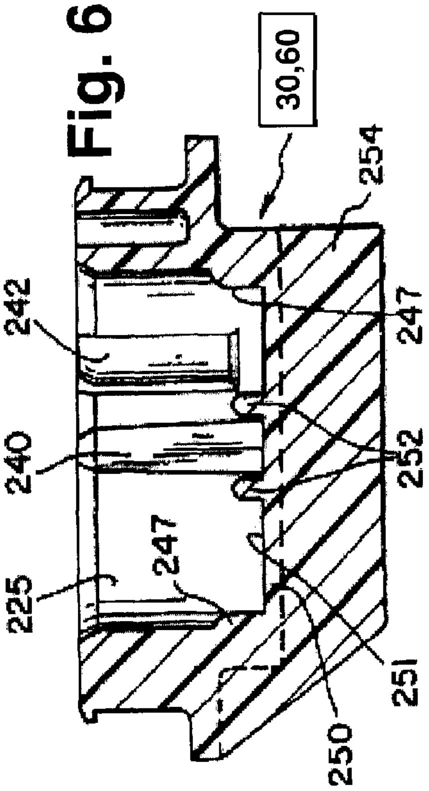
FIG. 6 is a cross-sectional view of the housing taken along line 6-6 of FIG. 5.

Referring now to FIGS. 5 and 6, housing 30 is illustrated in a top view and a cross-sectional view, respectively. Housing 30, 60 includes a central socket cavity 225 which is generally cylindrical in shape and into which contact insert 226 in body 32, 62 are received. Housing 30, 60 includes a key 240 which projects radially inwardly into cavity 225 and is used for properly orienting body 32, 62 with regard to housing 30, 60 during assembly. Housing 30, 60 further includes three recesses 242, 243, 244 which open into cavity 225 and which are formed into the housing in the radial wall 245 of housing 30, 60 which defines cavity 225. Recesses 242, 243, 244 respectively accommodate terminals 36 which are employed as the ground, major and minor electrical circuit contacts. A pair of contact insert keys 247 are also provided in cavity 225 to properly locate contact insert 226 in cavity 225. Arcuate cavities 249 in housing 30, 60 ensure that a constant wall thickness is maintained, thereby reducing the plastic consumption of housing 30, 60 without compromising its rigidity or operation.

Preferably provided on the upper interior surface of bottom wall 250 of socket cavity 225 are a plurality of energy directors or ribs 252. Energy directors 252, which include triangular configured top surfaces, extend axially upwardly in cavity 225 from bottom wall 250 of the cavity. Energy directors 252 as shown ensure proper securing of body 32, 62 to housing 30, 60 when attachment by means of sonic welding is employed. Body 32, 62 is more particularly shown in FIGS. 7-9. As best seen in FIGS. 2 and 6, axially projecting downwardly from housing 30, 60 is a flange 254 which can be used as a grip for rotating lamp socket assembly 201 during its insertion and extraction.

Figure 8:
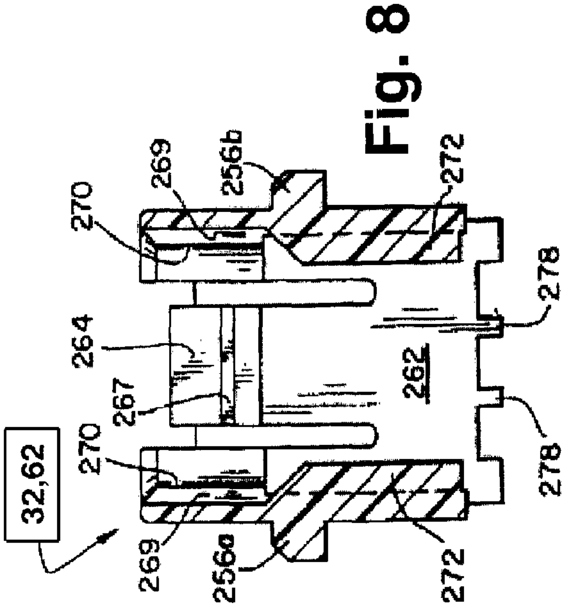
FIG. 8 is a cross-sectional view of the body taken along line 8-8 of FIG. 7.
Figure 9:
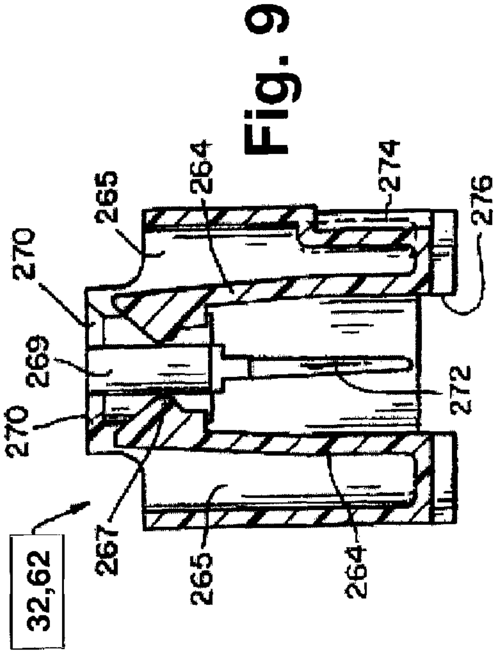
FIG. 9 is a cross-sectional view of the body of FIG. 7 taken along line 9-9.
Figure 7:
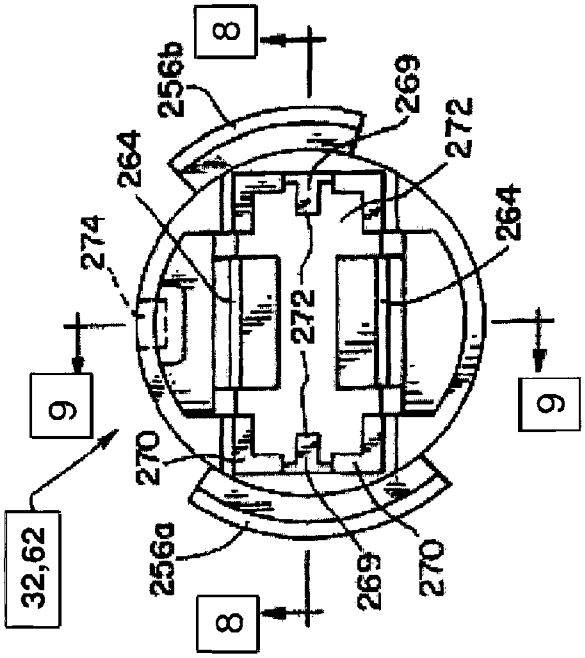
FIG. 7 is a top plan view of the socket assembly body.

Body 32, 62 is more particularly shown in FIGS. 7-9. The exterior surface of body 32, 62 includes radially projecting locking lugs **256*a* and 256*b*. Locking lugs 256, which are positioned around body 32, 62 at angular orientations corresponding to the configuration of mating keyed apertures in backplate assembly 12, are used to install and lock lamp socket assemblies 19, 20, 21 to backplate assembly 12. It will be appreciated that lugs 256 could be formed by axial projections of housing 30, 60. Moreover, while camming lugs are preferred, other means for installing assemblies 19, 20, 21 to backplate assembly 12, including the use of resilient fingers on one part for engaging complementary grooves in the other part, are within the scope of the invention. Locking lugs 256*a* and 256*b* are keyed such that socket assembly 12 cannot be inserted incorrectly when secured to backplate assembly 12. Each locking lug 256*a* and 256*b* includes a camming surface 258, and locking lug 256*b* may include a downwardly extending stop shoulder at its trailing end for abutting with an exposed portion of upper body panel. Camming surfaces 258 cam over the upper surface of upper panel of backplate assembly 12 during insertion of the assembled lamp socket assembly. During this insertion, the lamp socket assemblies 19, 20 and 21, and in particular a snugly fitting axial seal 31, is drawn into a sleeve 33 such that mounting flange 35 contacts the bottom edge of one of sleeves 33. In this manner, backplate assembly 12 is captured between the bottom surfaces, of lugs 256 and the top, annular-shaped surface of mounting flange 35. Stop shoulder 260 positively halts the rotational insertion of lamp socket assembly 19, 20, 21** at a proper rotational orientation such that the terminals are aligned with and touch contact pads, respectively.

Body 32, 62 also includes a pair of diametrically opposed guide slots 269 defined by flanking shoulders 270. Guide slots 269 are bounded at their lower ends by a pair of stop ribs 272. Guide slots 269 and ribs 272 are structured complementarily to lamp base 217. Lamp base 47 includes radial protrusions on either end face (not shown) that slide within slots 269 and which abut ribs 272 in the mounted portion of lamp 22. Guide slots 269 serve to align lamp base 47 and ensure that a two-filament lamp 22 is being inserted, as a one-filament lamp typically used in other applications does not fit into guide slots 269. During insertion of lamp 22 into through passage 262, ribs 272 prevent over-insertion of lamp 22 into body 32, 62. Body 32, 62 also includes a key slot 274 formed in the exterior surface of the body. Key slot 274 cooperates with key 240 located in central socket cavity 225 as shown in FIG. 5 to properly orient body 32,62 during assembly thereof to base 30,60. A slot 276 as shown in FIG. 9 is provided in the bottom portion of body 32, 62 for accommodating contact insert 226 during assembly thereof to housing 212 and body 214. Welding ribs 278 are provided on the bottom surface of body 214 for cooperating with energy directors 252 when body 214 is welded to housing 212. Welding ribs 278 are configured such that the voids or spaces defined between adjacent ribs serve as cavities in which terminals 233-235 are received.

Following assembly of housing 30, 60, body 32, 62, contact 34 and terminal 36, the assembly is subjected to sonic welding or another suitable welding technique which is applied to bottom 250 of housing 212. The provision of energy directors 252 with upstanding triangular ribs thereon provides proper guidance to the energy applied by the sonic welding process to provide melting of the triangular ribs portions and securement of body 32, 62 to housing 30, 60. As energy directors 252 are axially oriented with respect to cavity 225 and body 32, 62, body 32, 62 will further enter cavity 225 when energy directors 252 melt as the body and housing are welded together. Sonic welding will be stopped when the distance between the bottom surface of lugs 256 and the top surface of mounting flange 224 is within prescribed limits. By proper design of axial energy directors 252, the strength and uniformity of the sonic weld will be within acceptable tolerances. After sonic welding is complete, axial seal 31 is installed, and lamp 22 is snapped into engagement with retaining fingers 264. Assembly of lamp socket assembly 10 is complete.

Other plastic components within the lamp assembly 10 can be made from the nylon 4,6 in addition to or in lieu of forming the lamp socket from this material. Preferably, all of those components exposed to the UV light emitted from the incandescent bulb, and particularly those exposed to higher heat levels, such as the body 32, 62, are formed from nylon 4,6. For example, the reflectors 13-15 can also be made from the nylon 4,6. Alternatively, they can be, for example, formed from a more commonly used plastic and then metallized which provides reduced outgassing in addition to providing improved visible light reflectivity.

Figure 4:
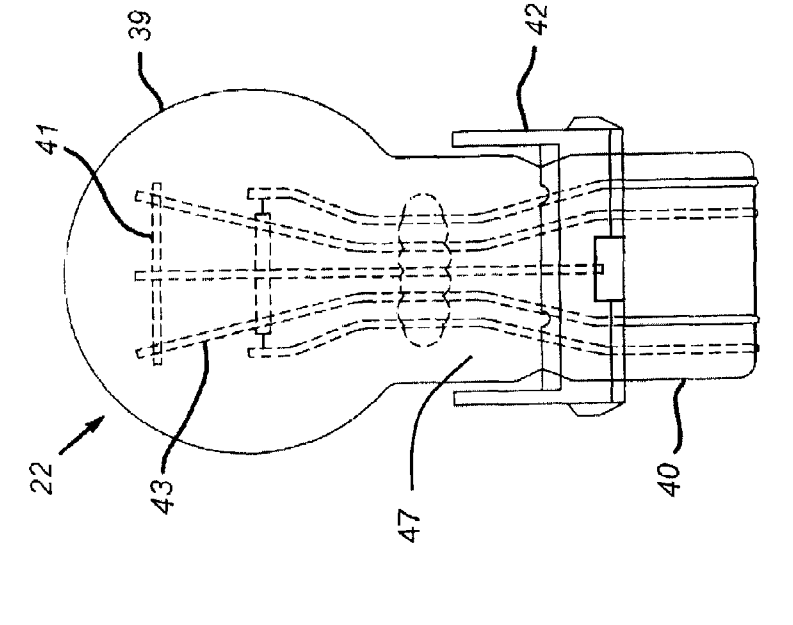
FIG. 4 is a side view of an incandescent bulb constructed in accordance with the invention.

With reference now to FIG. 4, there is shown the incandescent bulb 22 in greater detail. The bulb 22 includes a clear glass bulb envelope 39 closed at its press-sealed end 40. Within the bulb envelope 39 is a pair of filaments 41 supported by lead wires 43 that extend through the press-sealed end 40 to exposed locations on the surface of the bulb. The plastic sleeve 42 is fitted over the press-sealed end 40 and covers the terminal ends of the lead wires. More specifically, the sleeve 42 had a base portion that includes an interior passage. The Sleeve 42 is located on the sealed end 40 of the bulb 22, with the sealed end 40 extending through the interior passage. In accordance with another aspect of the invention, the plastic sleeve 42 is made from nylon 4,6. Other plastics which have reduced outgassing, such as PEI and PPA can also be used. Bulbs 23 and 24 can be constructed in the same manner as bulb 22. Further, in some bulb 22 configurations, the press-sealed end 40 of bulb 22 and plastic sleeve 42 may be replaced by a molded plastic base (not shown), such as a cylindrical plastic base, having terminals therein that attach to the terminal ends of the lead wires 43 an extend outwardly so as to be operatively electrically connected to the socket assembly. The plastic base may also be formed from nylon 4,6, PEI or PPA.

In the embodiments described above, the nylon 4,6 is of the type that is sold commercially under the trademark Stanyl available from Koninklijke DSM N.V., (http://www.dsm-.com/en). This highly crystalline form of polyamide (nylon) is unlike those having non-crystalline morphologies, such as nylon 6,6 and nylon 6. The reason for this is that it has a highly crystalline polymer structure as well as a relatively low glass transition temperature (TG), and a relatively high melt temperature (TM) and heat deflection temperature (HDT). Nylon 4,6 and other nylons absorb considerable quantities of water which in turn affect the mechanical properties of the material by reducing the stiffness and strength while increasing the toughness. Nylon 4,6 is different, however, because of the relatively low TG. The glass transition temperature occurs when the material shifts from a more crystalline molecular structure to a more amorphous molecular structure. In the amorphous structure, the polymer molecules are able to move more easily, thus the material is less rigid. Due to the operating temperature of the socket body 32, 62, (anywhere from 200 F-450° F.) a TG in this range would affect the mechanical properties at their most critical point mechanically. Nylon 4,6 has a lower TG which is outside of this operating range. During operation of the socket assembly, the change in mechanical properties at the TG does not further negatively affect the function of the light socket. The water absorbed is driven out once the plastic sees temperatures over 100° C. Absorbed moisture, therefore, is not present and does not affect the mechanical properties over the operating temperature range. Due to the highly crystalline structure of nylon 4,6, the water is driven out of the polymer without causing hydrolytic degradation, which breaks amino bonds and begins the outgassing process. These unique characteristics of nylon 4,6, make it particularly suitable for light socket applications.

It will thus be apparent that there has been provided in accordance with the present invention a lamp socket assembly having one or more components formed from a UV-stabilized plastic which achieves the aims and advantages specified herein. It will of course be understood that the foregoing description is of preferred exemplary embodiments of the invention and that the invention is not limited to the specific embodiments shown. Various changes and modifications will become apparent to those skilled in the art. All such variations and modifications are intended to come within the scope of the appended claims.

The invention claimed is:

1. A lamp socket assembly, comprising:
a socket having an opening to receive a press-sealed end of a light source;
a plurality of electrical contacts located in said opening; and
a plurality of terminals, each of which is electrically connected to one of said contacts;
said socket comprising a housing and a separate body integrally attached to said housing and adapted to receive said light source, said body comprising 100 wt. % nylon 4,6.

2. A lamp socket assembly of claim 1, wherein said housing comprises a polyamide.

3. A lamp socket assembly of claim 2, wherein said housing comprises a polyamide from a group consisting of nylon 6, nylon 6,6 and nylon 4,6.

4. A lamp socket assembly of claim 2, wherein said housing comprises a co-polymer blend of polyamide and polyphenylene oxide.

5. A lamp socket assembly of claim 1, wherein said housing and said body are integrally attached by ultrasonic welding.

6. A lamp socket assembly of claim 1, wherein said light source is an incandescent lamp.

7. A bulb, comprising:
a glass envelope having an interior space and a sealed end;
a light emitting element contained in said interior space;
a plurality of lead wires at least partially supporting said light emitting element in said interior space, said lead wires extending from said interior space through said glass envelope to an exposed location at said sealed end;
a sleeve attached to said glass envelope at said sealed end, with said sleeve being located on said sealed end such that said sealed end extends through said sleeve;
wherein said sleeve comprises 100 wt. % nylon 4,6.

8. An automotive lamp assembly, comprising:
a lamp socket;
an incandescent bulb removably mounted within said lamp socket;
a reflector extending at least partially around said bulb; and
a lens, wherein said lamp socket comprises a housing and a separate body integrally attached to said housing and adapted to receive said light source, said body comprising 100wt. % nylon 4,6.

9. An automotive lamp assembly as defined in claim 8, further comprising:

a plurality of electrical contacts located in an opening in said lamp socket; and a plurality of terminals, each of which is electrically connected to one of said contacts;

wherein said socket includes at least one flexible retaining member located at said opening to engage the incandescent bulb and thereby retain the bulb within said opening.

10. An automotive lamp assembly of claim 9, wherein the bulb includes a press-sealed end having a plastic sleeve in contact with said retaining member(s), said plastic sleeve comprising a member from the group consisting of nylon 4,6, polyetherimide (PEI) and polyphthalamide (PPA).

* * * * *